Patented Feb. 5, 1924.

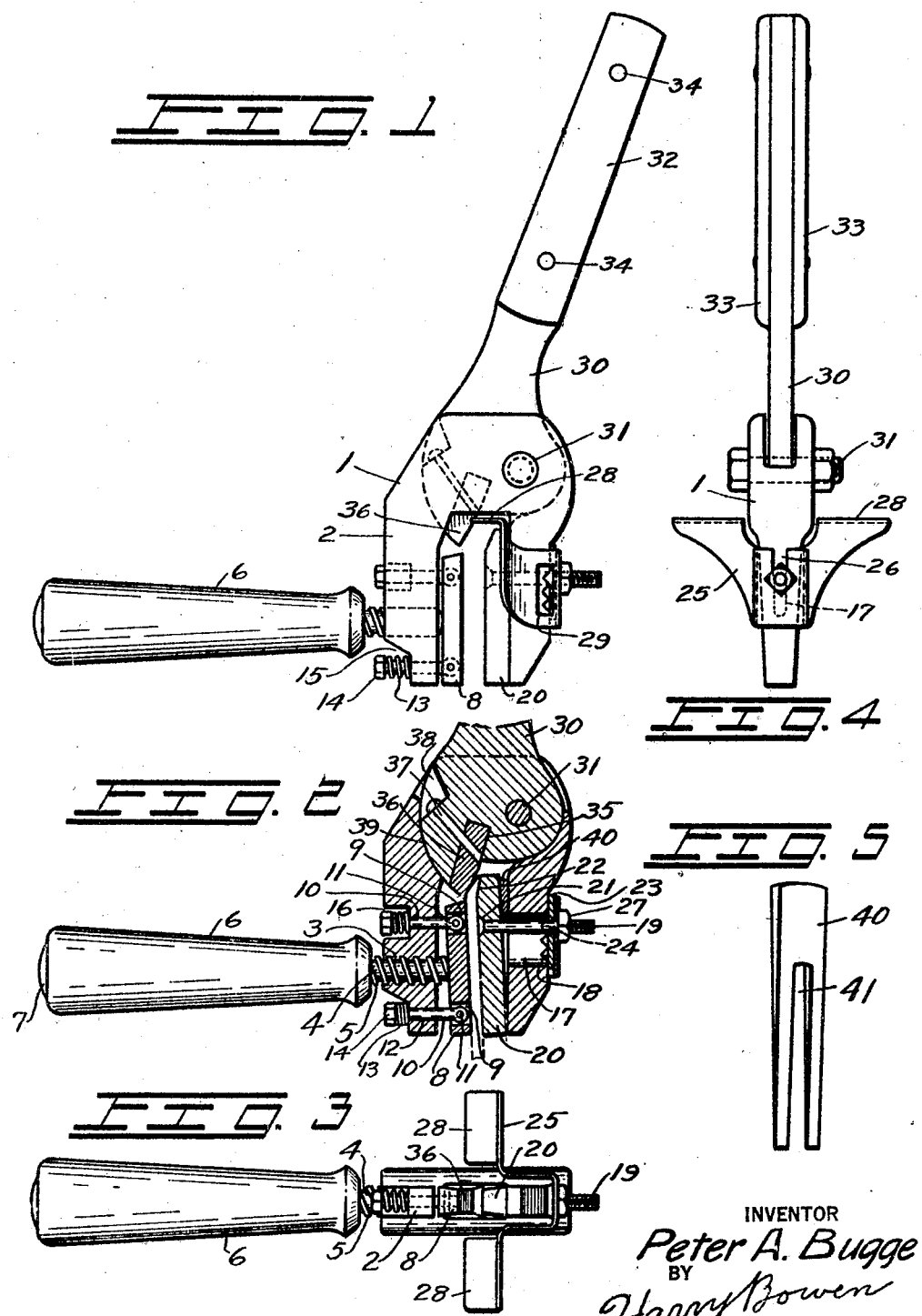

1,482,780

UNITED STATES PATENT OFFICE.

PETER A. BUGGE, OF SEATTLE, WASHINGTON.

SAW SET.

Application filed January 3, 1922. Serial No. 526,528.

*To all whom it may concern:*

Be it known that I, PETER A. BUGGE, a citizen of the United States, residing at Seattle, county of King, and State of Washington, have invented a new and useful Saw Set; and I do hereby declare that the following is a full, clear, and exact specification, such as will enable others skilled in the art to which it appertains to make and use the same.

The invention is a device for setting saw teeth which absolutely grips and holds the saw blade while the tooth is being bent.

The object of the invention is to construct a saw set which may easily be placed over the top of the saw and by a short turn of the handle by which the saw set is held, it will firmly grip the saw blade, then by pulling another handle at the top of the saw set, the tip of the tooth may be bent to the desired angle.

Another object of the invention is to construct a saw set which may be readily locked on the saw blade in which is a removable wearing plate, which has a beveled surface at its top against which the tip of the tooth is bent so that plates with different bevels may be furnished for different sizes of saws or for different degrees of set.

Another object of the invention is to construct a saw set which grips the blade of the saw in which the plate against which the tip of the saw is bent may be moved upward or downward or set on a bevel by placing a shim behind it.

And still another object of the invention is to construct a saw set which will firmly grip the blade of the saw, in which is a removable finger for bearing against the tip of the tooth when setting the saw so that this finger may easily be replaced or another one inserted in its place with a different bevel.

With these ends in view, the invention embodies an inverted U shaped casing with a lever pivotally mounted in the center of the upper part of it in which is a slot into which the finger which bears against the saw tooth may be placed. In one side of the lower part of the casing is a handle mounted in a quick screw thread so that as it is turned in a clockwise direction it will move inward and jam a plate which is held on two bolts in slots in this side of the casing up against the saw blade. The bolts supporting the plate project outside of the casing and have springs on them for drawing the plate back against the inside of the casing when the handle is screwed outward. In the opposite member of the casing is a slotted hole with V shaped notches across the outside of the casing and a bolt thru the slot with a plate on the inside and a washer on the outside with V shaped projections on it to fit in the notches in the casing and a guard, with a slotted hole in it so that it may be set upward or downward, locked under the nut on the bolt.

Other features and advantages of the invention will appear from the following description taken in connection with the drawings, wherein—

Figure 1 is a side elevation.

Figure 2 is a cross section on the center line.

Figure 3 is a bottom view of Figure 1.

Figure 4 is an end elevation.

Figure 5 is a detail view of the shim.

In the drawings I have shown my saw set as it would be constructed in Figure 1 wherein numeral 1 is the casing which is constructed in the form of an inverted U with a slot in the center of its top. One jaw 2 of the casing has a threaded hole 3 in it in which is the bolt 4 which has threads 5 on its extended end and which has a handle 6 rigidly held upon it by riveting the outer end 7. It will be seen that as this handle is turned in a clockwise direction the bolt 4 will move into the jaw 2 and push a plate 8 outward to the position shown in Figure 2. The plate 8 has slots 9 thru it in which the bolts 10 are held on the pins 11 which pass thru the plates and slots laterally. The bolts 10 are also slidably held in holes 12 in the jaw 2 and on the outer ends of the bolts are springs 13 and nuts 14 which draw the plate 8 back into the position shown in Figure 1 when the handle 6 is turned in a counter-clockwise direction and the bolt 4 withdrawn. In the lower end of the jaw 2 is a notch 15 against which one of the springs 13 bear and around the upper bolt 10 is a countersunk recess 16 into which the spring on the upper bolt is placed.

In the opposite side of the casing is a slotted hole 17 and in the outer surface of the casing are V shaped notches 18. A bolt 19 rests in the slotted hole 17 and has a plate 20 held in a countersunk hole 21 on its inner end. The upper end of the plate 20 has a beveled surface 22 against which the tip of the saw tooth is bent. It will be seen that this bevel may be made at any desired angle to fit any type of saw and several plates with different bevels may be furnished. On the outer end of the bolt is a washer 23 which has a V shaped lug 24 on its inner side to fit into the V shaped notches 18. When it is desired to move the plate 20 upward or downward, the notches 24 may be set in either of the similar notches 18. Outside of this washer is a guard 25 in which is a slotted hole 26, as shown in Figure 4, which fits over the bolt 19 and is held in place by the nut 27. This guard is bent inward and upward, as shown in Figure 1, and has flanges 28 on its upper end which ride on top of the saw teeth when the saw set is being adjusted. In the side of this guard is an opening 29 thru which the notches in the side of the casing may be seen so that the operator may easily determine the height of the plate 20.

In the upper part of the casing is a lever 30 pivoted on a bolt 31 which passes thru the sides of the casing and on the upper end of this lever is a handle 32 which may have strips 33 on each side of it and these strips held in place by rivets 34. These strips 33 may be made of wood or any suitable material so that they will be easy to grip in cold weather. The lower end of the lever 30 is shaped as shown in Figure 2 and has a recess 35 in its lower side in which a finger 36 may be held by a pin 37, the head of which fits into a recess 38 in the side of the lever. The lower end of the lever projects downward to a point 39 which gives a positive bearing against the back of the finger 36.

In Figure 5, I have shown a shim 40 which may be placed behind the plate 20 and as it has a slotted hole 41 in it, may be moved upward or downward to give the plate 20 any desired bevel. The shim as well as the plate will be locked in place by tightening the nut 27 on the bolt 19.

It will be understood that changes may be made in the construction without departing from the spirit of the invention. One of which changes may be in the omission of the finger 39 as this may be made a part of the lever 30; another may be in the use of a different type of springs for holding the plate 8 back against the inside of the casing; another may be in the omission of the guard 25 or in the changing of the shape of it and still another may be in the omission of the shim 40 or in the use of two shims instead of one, or in the use of a square shim instead of a beveled one which would move the plate outward parallel to the frame.

The construction will be readily understood from the foregoing description. To use the saw set it will be set on top of a saw and placed over a tooth so that the center of the tooth will be in line with the center of the plate 20 and then the handle 6 will be turned in a clockwise direction until the plate 8 bears against the side of the saw blade. The lever 30 will then be pulled towards the center of the set and the finger 36 will bear against the tip of the tooth and bend it until the back of the tooth bears against the bevel 22 on the plate 20 as shown in Figure 2. The lever 30 is then moved backward, the handle 6 screwed out and the saw set moved to the next tooth where the same operation is repeated. It will be seen that the plate 20 may be moved upward or downward or may be changed to another plate with a different bevel so that the saw set may be used on any size or type of saw.

Having thus fully described the invention what I claim is new and desire to secure by Letters Patent is:

1. A saw set of the type described embodying an inverted U shaped casing with a longitudinal slot in the center of its top; a lever pivotally mounted on a pin in this slot with a handle on its upper end; a finger held by a pin in a slot in the lower end of the lever; a plate with slots in it; bolts, to which the plate is held by pins, in the slots in the plate, which bolts are slidably held in holes in the casing; springs on the bolts bearing against the outside of the casing; nuts on the ends of the bolts; a larger bolt between the two bolts mounted in a threaded hole in the casing, having a handle on its outer end by which it may be turned; another plate in the opposite side of the casing supported on a bolt which passes thru a slotted hole in the casing; a washer on the outer end of the bolt with V shaped lugs on it which fit into V shaped notches in the outside of the casing; a guard on the outside of the washer with a slotted hole in it and flanges on its upper side which project over the center of the slot between the two sides of the casing; and a nut on the bolt which locks the guard and plate in place.

2. A saw set of the type described comprising an inverted U shaped casing the vertical legs of which form jaws between which a saw may be clamped; a lever pivotally mounted on the inside of the casing; a projection on the lower end of the lever; plates on the inside of the jaws of the casing; a bolt supporting the plate on one side so that it may be moved upward or downward; a washer under the nut on the bolt with lugs on it to fit in notches on the outside of the casing; a guard also held under the nut so that it may be moved upward or downward and shaped so that it will bear on top of the saw teeth; a beveled surface on the upper corner of the plate in this side of the casing; bolts pivotally attached to the plate on the opposite side of the casing; springs suitably mounted on the bolts which hold the plate connected to the bolts back against the surface of the jaw and a handle fixedly mounted on a screw in a threaded hole in the casing which is situated at the center of the plate on this side of the casing.

3. A device of the type described embodying an inverted U shaped casing the vertical legs of which form jaws between which a saw may be clamped; a lever pivotally mounted in the upper side of the casing; a finger on the lower end of the lever; plates on the inside of each of the jaws of the casing; suitable means for supporting one of these plates and holding it against the inner surface of the casing; a screw in a threaded hole in the casing behind the center of this plate; suitable means for supporting the plate connected to the bolts in the opposite side of the casing so that it may be moved upward or downward and locked in place in any position and a shim for holding this plate outward at any desired angle.

4. A device of the type described embodying an inverted U shaped casing the vertical legs of which form jaws between which a saw may be clamped; a lever pivotally mounted in the upper side of the casing with a projection on its lower end; plates on the inside of each of the jaws of the casing; bolts and springs suitably arranged to support one of these plates and hold it against the inner surface of the casing; a screw in a threaded hole in the casing behind the center of this plate; a bolt in a slotted hole in the opposite side of the casing for supporting the other of said plates on this side; a washer under the head of the bolt with lugs on it to fit into notches in the side of the casing; and a guard with a slot in one side and a hole in another side, which guard has flanges in the upper side which project over the center of the space between the two plates on the inside of the jaw of the casing.

PETER A. BUGGE.